United States Patent [19]

Mast

[11] Patent Number: 4,559,770
[45] Date of Patent: Dec. 24, 1985

[54] ROUND BALER WITH DUAL FUNCTION FINGER DRUM

[75] Inventor: Aquila D. Mast, Lancaster, Pa.

[73] Assignee: Sperry Corporation, New Holland, Pa.

[21] Appl. No.: 594,002

[22] Filed: Mar. 27, 1984

Related U.S. Application Data

[63] Continuation-in-part of Ser. No. 497,932, May 25, 1983, Pat. No. 4,470,247.

[51] Int. Cl.⁴ .................... A01D 89/00; A01D 59/00
[52] U.S. Cl. ......................................... 56/341; 56/364
[58] Field of Search .................................. 56/341, 364

[56] References Cited

U.S. PATENT DOCUMENTS

| | | | |
|---|---|---|---|
| 3,545,185 | 12/1970 | Whitfield et al. | 56/364 |
| 4,172,354 | 10/1979 | Vermeer et al. | 56/341 |
| 4,212,149 | 7/1980 | Krone et al. | 56/341 |
| 4,255,923 | 3/1981 | Spaida et al. | 56/364 |
| 4,330,985 | 5/1982 | Shindelar | 56/341 |
| 4,345,421 | 8/1982 | Schwalenberg et al. | 56/341 |
| 4,464,889 | 8/1984 | Weelink | 56/341 |
| 4,470,247 | 9/1984 | Mast | 56/341 |

FOREIGN PATENT DOCUMENTS

| | | | |
|---|---|---|---|
| 64116 | 11/1982 | European Pat. Off. | 56/341 |
| 3037812 | 5/1982 | Fed. Rep. of Germany | 56/341 |

Primary Examiner—Paul J. Hirsch
Attorney, Agent, or Firm—Darrell F. Marquette; Frank A. Seemar; Larry W. Miller

[57] ABSTRACT

A finger drum having a plurality of extendable and retractable fingers is provided in a roll baling machine to feed crop material from a pickup device toward a bale forming apron and to help support a roll bale during its formation.

4 Claims, 2 Drawing Figures

ROUND BALER WITH DUAL FUNCTION FINGER DRUM

This application is a continuation in part of application Ser. No. 497,932, filed May 25, 1983 now U.S. Pat. No. 4,470,247.

This invention relates generally to roll baling machines typically referred to as round balers which form cylindrical roll bales of crop material.

The present invention is specifically directed to the use of a finger drum in a roll baling machine which includes bale forming means and pickup means. The finger drum moves crop material from the pickup means toward the bale forming means and also helps to support a roll bale during its formation by the bale forming means. The finger drum is comprised of a cylinder and a plurality of fingers that are movable between projected positions and retracted positions with respect to the cylinder. The fingers are in their projected positions when they are adjacent the pickup means and are in their retracted positions when they are adjacent a point on the cylinder where the roll bale contacts the cylinder.

DETAILED DESCRIPTION OF THE PREFERRED EMBODIMENT

Figure 1:
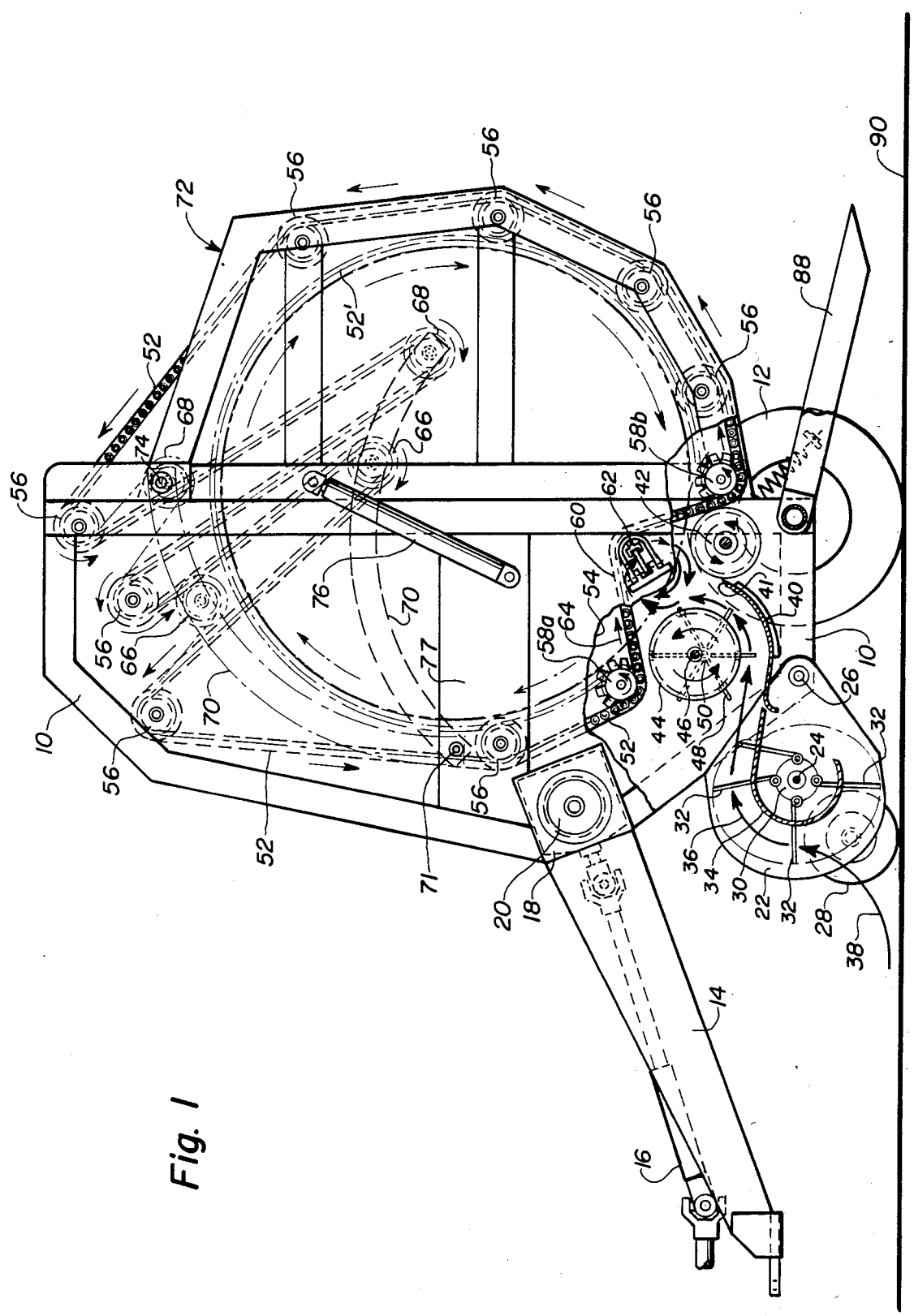
FIG. 1 is a side elevation of the baler embodying the principles of the present invention as seen from the left-hand side thereof, part of the machine being broken away to reveal details of certain elements of the machine.

Referring to FIG. 1, the baler shown therein comprises a mobile frame 10 supported by a pair of wheels 12 at opposite sides of said frame and a forwardly extending tongue 14 attachable at the forward end thereof to a suitable transport means such as a tractor, not shown. Said tractor also preferably has suitable power means for the baler in the form of a PTO, likewise not shown, but of a conventional means on such a tractor. Said PTO actuates a drive shaft 16 which operates a gearbox 18 for powering a main drive sheave 20 which operates all of the moving elements of the baler.

Extending forwardly from the lower portion of mobile frame 10 is a pickup device 22 which supports a transversely extending shaft 24. Pickup device 22 is of a limited floating nature with the rearward portions thereof pivoted at 26 to the lower forward portion of mobile frame 10, and with the forward portions thereof being supported by small wheels 28 at opposite ends of the pickup device 22.

The shaft 24 has flanges 30 spaced therealong with each flange 30 having a plurality of fingers 32 pivoted thereto. The fingers 32 extend through appropriate openings or slots in an arcuate shield 34 which extends partially around the shaft 24 and flanges 30. It will be seen that as the shaft 24 and the fingers 32 rotate in the direction of the arrow 36, the fingers 32 will be projected for engagement with a windrow of crop material to raise the same from the ground, in a path indicated by arrow 38, and to move the material rearwardly around the outer surface of the shield 34 onto a rigid guide plate 40 which extends between the upper end of the shield 34 and a supplemental guide and support roller 42.

As the crop material is moved onto the guide plate 40, it is engaged by what is known conventionally as a finger feed drum 44. The finger feed drum 44 includes a cylinder 45 and is mounted upon a shaft 46 which rotates counterclockwise as shown in FIG. 1 by the direction arrows included therein, and a plurality of fingers 48 are connected at the inner ends thereof to an internal pivot 50 which is offset with respect to the axis of shaft 46. As the finger feed drum 44 revolves, the fingers 48 move from a projected position as they engage the material moving along the guide plate 40 to a retracted position as they reach the upper portion of the finger feed drum 44. This is due to the offset pivot 50.

At this point in the operation of the machine, it is necessary to describe the endless flexible apron 52 which is of conventional construction. Preferably, the apron 52 comprises a pair of similar endless chains and a plurality of bars or slats which extend between said chains but are spaced therealong at suitable distances. For a fuller description of such aprons, attention is directed to prior U.S. Pat. No. 3,901,007. A portion of apron 52 is shown in the upper right-hand part of FIG. 1 in full lines. Another portion of the apron, above the finger feed drum 44 and supplemental guide and support roller 42 is also shown in full lines in FIG. 1 through an opening 54 broken away in the side of the mobile frame 10. A plurality of guide and support rollers 56 are rotatably supported on the frame 10. The apron 52 extends around these rollers 56 and also around a pair of sprockets 58. A section 60 of apron 52 which extends between said pair of sprockets 58 cooperates with the finger feed drum 44 to contain the crop material which is formed into a roll. The section 60 of the apron also extends around and is supported by guide members 62, and at least one of the sprockets 58 is driven to move the section 60 of the apron in the direction of arrow 64, whereby said section 60 of the apron engages the material coming from the finger feed drum 44 and rotates the same clockwise as shown by the various directional arrows adjacent guide member 62 in FIG. 1. The apron 52 extends around additional idlers 66 and 68 which are supported upon a pair of arcuate arms 70 which are pivoted at 71 on the frame 10. The arms 70 are shown by broken lines in FIG. 1, in their lower position and in their upper position.

It will be understood that as the coiled roll of crop material is rotated clockwise as shown in FIG. 1, it will increase in diameter and in doing so moves the section 60 of apron 52 out of contact with the guide members 62 and ultimately into the substantially circular, large diameter disposition 52' of said apron. In said latter disposition, the roll bale has substantially been formed to its desired diameter and is ready to be discharged from the machine. While being formed, the roll bale is supported collectively by finger feed drum 44, supplemental guide and support roller 42, and the section 60 of the apron 52 which extends around the roll bale. The supplemental guide and support roller 42 also serves to strip crop material from the apron 52 and thereby minimize the amount of crop material which may be lost between the roller 42 and apron 52 during bale formation. Likewise, the guide plate 40 has an edge 41 thereof which is positioned to strip crop material from the supplemental guide and support roller 42 to further minimize the loss of crop material.

As already indicated, the finger feed drum 44 has a dual function in moving crop material from the pickup device 22 toward the apron 52 and in helping to support a roll bale during its formation. In order to perform this dual function, the finger feed drum 44 is positioned, as shown in FIG. 1, so that the fingers 48 thereof are in their retracted positions at the point on the cylinder 45 where a bale contacts the cylinder 45 to be supported. This prevents the fingers 48 from penetrating the bale and damaging its outer surface. The fingers 48 are in their projected positions at the side of the cylinder 45 adjacent the pickup device 22 to take over crop material therefrom.

The mobile frame 10 supports what is commonly known as a tailgate frame 72 which is used in the discharge of a completed bale. The tailgate frame 72 is shown elevated in FIG. 2 where it will be seen that an upper corner thereof has pivot means 74 which connect the tailgate frame to the mobile frame 10. The tailgate frame 72 is moved from the normal, closed position thereof, shown in FIG. 1, to an elevated, open position thereof by means of a pair of hydraulic cylinders 76 which extend between a stationary frame member 77 on mobile frame 10 and the innermost frame member 78 of the tailgate frame 72.

Figure 2:
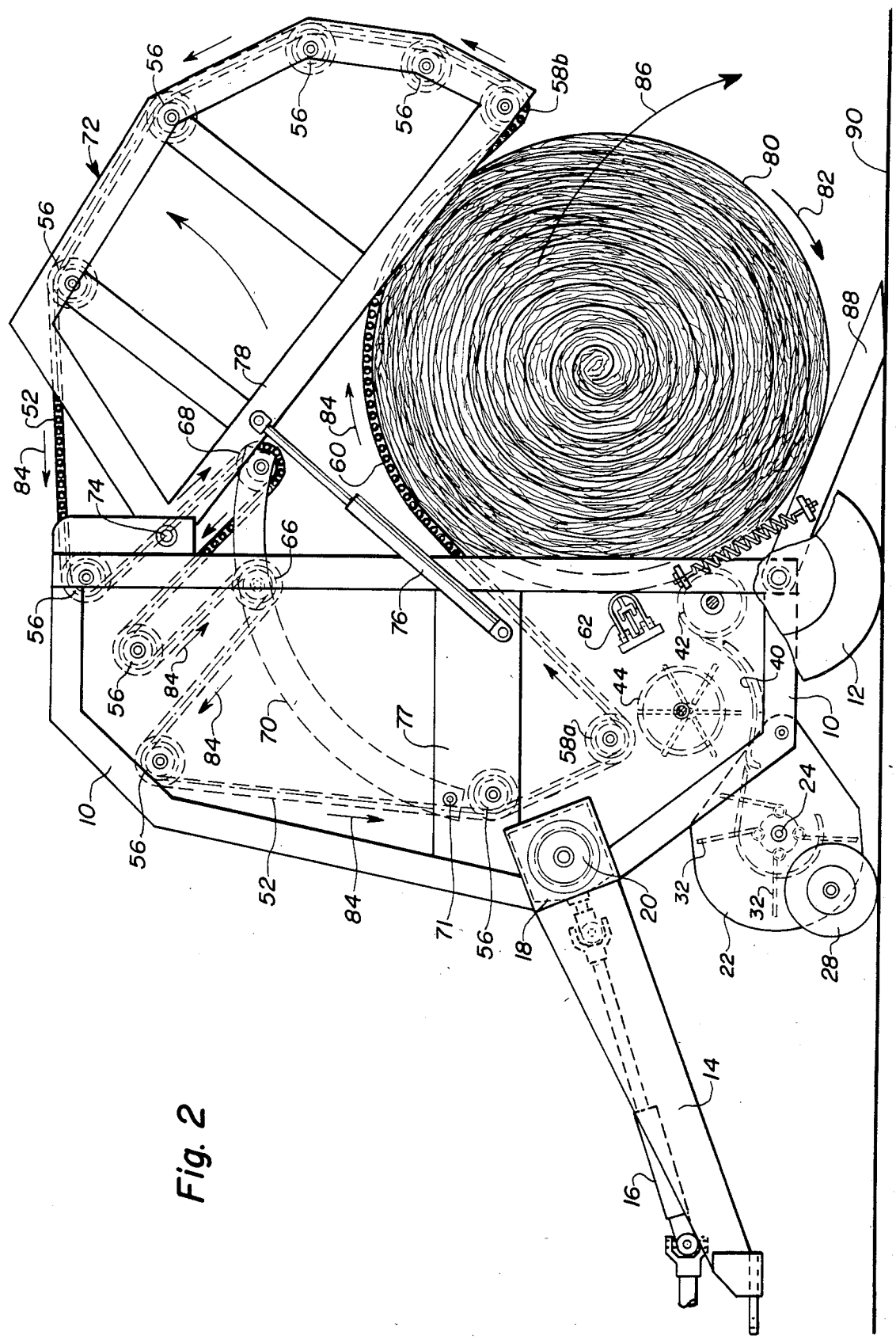
FIG. 2 is a side elevation of the machine shown in FIG. 1 illustrating the tailgate frame of the machine elevated partially as when a completed bale is being discharged by natural rolling from the machine.

When the roll bale 80 has been completed by coiling the crop material spirally into a roll of desired diameter as illustrated in exemplary manner in FIG. 2, a suitable valve, not shown, is actuated by the operator of the tractor to expand the hydraulic cylinders 76 at opposite sides of the frame 10 to raise the tailgate frame 72 as shown in FIG. 2 in order that the roll bale 80, which has been rotating clockwise during formation as viewed in FIGS. 1 and 2 and as indicated by the direction arrow 82, is discharged. Upon the raising of the tailgate frame 72, it will be seen that the apron 52 continues moving in the direction of the arrows 84 and the section 60 of the apron which engages the upper portion of the roll bale 80 further urges the roll bale 80 to roll outwardly and downwardly in its natural clockwise direction as indicated by the arrow 86. A ramp 88 is pivotally connected to the mobile frame 10 in order that the roll bale 80 may be eased in its natural rolling manner down to the ground surface 90.

As soon as the completed roll bale 80 has been discharged as described, the hydraulic cylinders 76 are contracted rapidly to restore the tailgate frame 72 closed to the position shown in FIG. 1 and as the tractor or other means which propels the baler resumes forward movement, the apron 52 already is in operation along with pickup device 22, finger feed drum 44, and supplemental guide and support roller 42. These elements are all driven either directly or indirectly from the main drive sheave 20 by conventional means such as chains and sprockets or belts and sheaves.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

Having thus described the invention, what is claimed is:

1. In a roll baling machine having a mobile frame, bale forming means supported on said mobile frame, pickup means supported on said mobile frame for engaging and picking up crop material, the improvement comprising:

a finger drum for moving crop material from said pickup means toward said bale forming means and for assisting in supporting a roll bale during formation thereof by said bale forming means;

said finger drum including a cylinder and a plurality of fingers movable between fully projected positions extending from said cylinder and fully retracted positions within said cylinder; and said fingers being in said fully projected positions when they are adjacent said pickup means to thereby take crop material from said pickup means and move it toward said bale forming means, and said fingers being in said fully retracted positions when they are adjacent a point on said cylinder where the roll bale contacts said cylinder to thereby prevent said fingers from penetrating the outer surface of the roll bale.

2. The improvement of claim 1, wherein said bale forming means comprises an endless flexible apron having an expandable section.

3. The improvement of claim 2, wherein said finger drum moves crop material from said pickup means into engagement with said expandable section of said endless flexible apron, during bale formation.

4. A roll baling machine comprising:

a mobile frame;

bale forming means supported on said mobile frame;

pickup means supported on said mobile frame for engaging and picking up crop material;

a finger drum for moving crop material from said pickup means toward said bale forming means and for assisting in supporting a roll bale during its formation by said bale forming means;

said finger drum including a cylinder and a plurality of fingers movable between fully projected positions extending from said cylinder and fully retracted positions within said cylinder, said fingers being in said fully projected positions when they are adjacent said pickup means and being in said fully retracted positions when they are adjacent a point on said cylinder where the roll bale contacts said cylinder so that said fingers take crop material from said pickup means and move it toward said bale forming means without penetrating the outer surface of the roll bale.

* * * * *